(12) United States Patent
Adkins et al.

(10) Patent No.: US 11,407,874 B2
(45) Date of Patent: Aug. 9, 2022

(54) POLYOL PREMIXES, THERMALLY INSULATING RIGID POLYURETHANE FOAMS AND METHODS FOR THEIR PRODUCTION

(71) Applicant: Covestro LLC, Pittsburgh, PA (US)

(72) Inventors: Rick L. Adkins, Canonsburg, PA (US); Brandon W. Parks, McKees Rocks, PA (US); Steve L. Aprahamian, McMurray, PA (US); Carson C. Miller, Pittsburgh, PA (US); Emily E. Connor, Canonsburg, PA (US)

(73) Assignee: COVESTRO LLC, Pittsburgh, PA (US)

( * ) Notice: Subject to any disclaimer, the term of this patent is extended or adjusted under 35 U.S.C. 154(b) by 283 days.

(21) Appl. No.: 16/594,183

(22) Filed: Oct. 7, 2019

(65) Prior Publication Data
US 2021/0102040 A1    Apr. 8, 2021

(51) Int. Cl.
| | |
|---|---|
| *C08J 9/08* | (2006.01) |
| *C08G 18/12* | (2006.01) |
| *C08G 18/18* | (2006.01) |
| *C08G 18/20* | (2006.01) |
| *C08G 18/30* | (2006.01) |
| *C08G 18/38* | (2006.01) |
| *C08G 18/42* | (2006.01) |
| *C08G 18/48* | (2006.01) |
| *C08G 18/50* | (2006.01) |
| *C08G 18/76* | (2006.01) |
| *C08J 9/14* | (2006.01) |

(52) U.S. Cl.
CPC ............... *C08J 9/08* (2013.01); *C08G 18/12* (2013.01); *C08G 18/1808* (2013.01); *C08G 18/1816* (2013.01); *C08G 18/2036* (2013.01); *C08G 18/30* (2013.01); *C08G 18/3819* (2013.01); *C08G 18/4244* (2013.01); *C08G 18/4816* (2013.01); *C08G 18/4829* (2013.01); *C08G 18/5024* (2013.01); *C08G 18/5027* (2013.01); *C08G 18/7664* (2013.01); *C08J 9/141* (2013.01); *C08G 2110/005* (2021.01); *C08G 2110/0025* (2021.01); *C08J 2203/02* (2013.01); *C08J 2203/14* (2013.01); *C08J 2203/184* (2013.01); *C08J 2205/052* (2013.01); *C08J 2205/10* (2013.01); *C08J 2207/00* (2013.01); *C08J 2375/04* (2013.01)

(58) Field of Classification Search
CPC .......................... C08G 18/12; C08G 18/1808; C08G 18/1816; C08G 18/2036; C08G 18/30; C08G 18/302; C08G 18/3819; C08G 18/4018; C08G 18/4072; C08G 18/4202; C08G 18/4208; C08G 18/4244; C08G 18/4816; C08G 18/4829; C08G 18/4837; C08G 18/4879; C08G 18/4883; C08G 18/5021; C08G 18/5024; C08G 18/5027; C08G 18/6229; C08G 18/632; C08G 18/638; C08G 18/6484; C08G 18/7664; C08G 2110/0025; C08G 2110/005; C08J 9/08; C08J 9/141; C08J 2203/02; C08J 2203/14; C08J 2203/184; C08J 2205/052; C08J 2205/10; C08J 2207/00; C08J 2375/04

See application file for complete search history.

(56) References Cited

U.S. PATENT DOCUMENTS

| | | | |
|---|---|---|---|
| 5,668,187 | A | 9/1997 | Asako et al. |
| 6,013,731 | A | 1/2000 | Holeschovsky et al. |
| 6,602,450 | B1 | 8/2003 | Sato et al. |
| 6,833,390 | B2 | 12/2004 | Haider et al. |
| 7,456,229 | B2 | 11/2008 | Hager et al. |
| 7,750,058 | B2 | 7/2010 | Haider et al. |
| 8,293,807 | B2 | 10/2012 | Emge et al. |
| 8,383,733 | B2 | 2/2013 | Adkins et al. |
| 9,505,881 | B1 * | 11/2016 | Adkins ............... C08F 290/067 |
| 9,951,174 | B2 | 4/2018 | McVey et al. |
| 2006/0058409 | A1 | 3/2006 | Zaschke et al. |
| 2007/0254973 | A1 | 11/2007 | Emge et al. |
| 2011/0046251 | A1 | 2/2011 | Hiroshi et al. |
| 2011/0060063 | A1 | 3/2011 | Tatsuya et al. |
| 2012/0004336 | A1* | 1/2012 | Loh .......................... C08J 9/146 521/131 |
| 2014/0275310 | A1 | 9/2014 | Adkins et al. |
| 2015/0299376 | A1 | 10/2015 | Miyata et al. |
| 2017/0306076 | A1* | 10/2017 | Adkins ................. C08F 283/06 |

FOREIGN PATENT DOCUMENTS

| | | |
|---|---|---|
| CN | 101962474 A | 2/2011 |
| CN | 103059249 A | 4/2013 |
| CN | 106750107 A | 5/2017 |
| EP | 0786480 B1 | 7/2003 |
| JP | 9087355 A2 | 3/1997 |
| JP | 2000169541 A | 6/2000 |
| JP | 2006009036 A | 1/2006 |
| JP | 2010254915 A | 11/2010 |
| KR | 960014192 A | 5/1996 |
| WO | WO 9960045 A1 | 11/1999 |

* cited by examiner

*Primary Examiner* — John M Cooney (74) *Attorney, Agent, or Firm* — Donald R. Palladino (57) ABSTRACT

Polyol premixes and thermally insulating rigid polyurethane foams, such as those that can be used as a thermal insulation medium in the construction of refrigerated storage devices, are disclosed. A polymer polyol having a OH number of greater than 260 mg KOH/g is utilized. The resulting polyurethane foams can exhibit improved thermal insulation properties without sacrificing other important physical and processing properties.

18 Claims, 2 Drawing Sheets

POLYOL PREMIXES, THERMALLY INSULATING RIGID POLYURETHANE FOAMS AND METHODS FOR THEIR PRODUCTION

FIELD

This specification pertains generally to thermally insulating rigid polyurethane foams, such as those that can be used as a thermal insulation medium in the construction of refrigerated storage devices. More particularly, the present invention relates to the use of polymer polyols ("PMPOs") in the production of such foams.

BACKGROUND

Rigid polyurethane foams are used in numerous applications. They are produced by reacting an appropriate polyisocyanate and an isocyanate-reactive compound, usually a polyol, in the presence of a blowing agent. One use of such foams is as a thermal insulation medium in the construction of refrigerated storage devices, including refrigerated appliances and tractor trailers. The thermal insulating properties of closed-cell rigid foams are dependent upon a number of factors, including the average cell size and the thermal conductivity of the contents of the cells.

The thermal conductivity of the contents of the cells depends upon the blowing agent used. Fluorocarbons have historically often been used because of their low thermal conductivity. However, fluorocarbons, including chlorofluorocarbons ("CFCs"), hydrofluorocarbons ("HFCs") and hydrochlorofluorocarbons ("HCFCs"), are greenhouse gases that are being phased out of use. Halogenated olefins, such as hydrofluoroolefins ("HFO") and hydrochlorofluoroolefins ("HCFOs"), are potential environmentally-friendly alternatives for such fluorocarbons, but they can be costly and they may react with certain catalysts often used in the reaction mixture, resulting in poor foam quality if a pre-mix composition containing the blowing agent and catalyst is aged prior to use.

In some cases, a hydrocarbon blowing agent is employed. Hydrocarbons, such as pentanes, are often desirable because they are often less expensive than CFCs, HFCs, HCFCs, HFOs, and HCFOs and they are more environmentally friendly than CFCs, HFCs, and HCFCs. A problem, however, is pentane's higher thermal conductivity relative to these blowing agents. Thus, improving the thermal efficiency of hydrocarbon-blown polyurethane foams is highly desirable.

Thermal efficiency, often evaluated with respect to a low thermal conductivity, or "K-factor", is a critically important feature of rigid polyurethane foam insulation. Even seemingly relatively small reductions in K-factor, such as on the order of just a few percent, can translate into very significant reductions in energy usage and cost over the lifetime of the device in which the foam is used. For example, according to some estimates, a 2% decrease in K-factor can result in approximately a 1% improvement in energy performance for a refrigerator, which can allow for using a smaller compressor, thus providing significant energy savings over the life of the refrigerator. Alternatively, the thickness of the refrigerator wall or door could be reduced while achieving similar insulation properties, thus allowing for increased internal storage space.

As a result, efforts are continuously made to reduce the thermal conductivity of rigid polyurethane foam insulation, including those produced using hydrocarbon blowing agents. Reducing the thermal conductivity of the foam cannot, however, come at the price of significantly deteriorating other important properties, including physical properties of the foam (such as dimensional stability or compressive strength) or processing characteristics (such as flow, reactivity and de-mold characteristics).

Therefore, hydrocarbon-blown rigid polyurethane foams that have improved, i.e., reduced, thermal conductivity, while at the same time exhibiting favorable physical properties and favorable processing characteristics, would be highly desirable.

The inventions described in this specification were made in view of the foregoing desire.

SUMMARY

In certain respects, the present disclosure is directed to polyol premixes. These premixes comprise: (a) a polyol composition comprising a polymer polyol having an OH number of greater than 260 mg KOH/g; (b) a catalyst; (c) a physical blowing agent composition comprising at least 50% by weight, based on the total weight of the physical blowing agent composition, of a hydrocarbon; and (d) a carbon dioxide generating chemical blowing agent.

In other respects, the present disclosure relates to closed-celled, rigid polyurethane foams. These foams comprise the reaction product of a reaction mixture comprising: (a) a polyisocyanate; (b) a polyol composition comprising a polymer polyol having an OH number of greater than 260 mg KOH/g; (c) a catalyst; (d) a physical blowing agent composition comprising at least 50% by weight, based on the total weight of the physical blowing agent composition, of a hydrocarbon; and (e) a carbon dioxide generating chemical blowing agent.

This specification is also directed to, among other things, methods for making such closed-celled, rigid polyurethane foams and polyurethane foam-forming reaction mixtures suitable for producing such closed-cell, rigid polyurethane foams.

BRIEF DESCRIPTION OF THE DRAWINGS

Various features and characteristics of the inventions described in this specification may be better understood by reference to the accompanying figures, in which.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents, each numerical parameter described in this specification should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. The term "hydroxyl number", as used herein, refers to the number of reactive hydroxyl groups available for reaction, and is expressed as the number of milligrams of potassium hydroxide equivalent to the hydroxyl content of one gram of the polyol, measured according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol-Equivalent Weight (g/eq)=(56.1×1000)/OH number.

Equivalent weights and molecular weights given herein in Daltons (Da) are number average equivalent weights and number average molecular weights respectively, as determined, unless indicated otherwise, by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As indicated, certain implementations of the present specification relate to the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams are the reaction product of a foam-forming reaction mixture that includes: (a) a polyisocyanate; and (b) a polyol composition. As used herein, the term "polyisocyanate" encompasses diisocyanates as well as higher functionality polyisocyanates.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates, such as 2,4,6-toluene triisocyanate; and higher functionality polyisocyanates, such as 4,4'-dimethyl-diphenylmethane-2,2',5,5'-tetraisocyanate and the polymethylene polyphenyl-polyisocyanates.

Undistilled or crude polyisocyanates may also be used. Crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of 25 to 35 weight percent, such as 29 to 34 weight percent, such as those based on a polyether polyol or polyester polyol and diphenylmethane diisocyanate.

In certain implementations, the polyisocyanate comprises a methylene-bridged polyphenyl polyisocyanate and/or a prepolymer of methylene-bridged polyphenyl polyisocyanate having an average functionality of from 1.8 to 3.5, such as from 2.0 to 3.1, isocyanate moieties per molecule and an NCO content of from 25 to 32 weight percent.

As indicated earlier, in some implementations, this specification relates to polyol premixes that comprise a polyol composition comprising a polymer polyol, i.e., a dispersion of polymer particles in a polyol. In some embodiments, the polymer polyol has a solids content, i.e., content of polymer particles, of 20% to 65% by weight, such as 20% to 60% by weight, or 20% to 50% by weight, based on the total weight of the polymer polyol.

In some embodiments, the polymer particles comprise a polymer comprising the free radical polymerization reaction product of an ethylenically unsaturated compound. More particularly, in some of these embodiments, the polymer polyol comprises a reaction product of a reaction mixture comprising: (a) a base polyol; (b) an ethylenically unsaturated compound, (c) optionally a preformed stabilizer, and (d) a free radical initiator.

Suitable base polyols include, for example, polyether polyols having a functionality of 2 to 6, such as 2 to 5 or 3 to 5, and an OH number of at least 200 mg KOH/g or at least 300 mg KOH/g, such as 300 to 1000 mg KOH/g, 300 to 800 mg KOH/g, 300 to 600 mg KOH/g, or, in some cases, 300 to 500 mg KOH/g or 300 to 400 mg KOH/g.

Specific examples of suitable base polyols include polyoxyethylene glycols, polyoxyethylene triols, polyoxyethylene tetrols and higher functionality polyoxyethylene polyols, polyoxypropylene glycols, polyoxypropylene triols, polyoxypropylene tetrols and higher functionality polypropylene polyols, mixtures thereof. When mixtures are used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylenediamine, and/or toluene diamine. The alkoxylation reaction may be catalyzed using any conventional catalyst including, for example, potassium hydroxide (KOH) or a double metal cyanide (DMC) catalyst.

Other suitable polyether polyols for the base polyol include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, and/or mannitol.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides, such as methyl glycoside and ethyl glucoside, glycol glucosides, such as ethylene glycol glycoside, propylene glycol glucoside, glycerol glucoside, and 1,2,6-hexanetriol glucoside, as well as alkylene oxide adducts of the alkyl glycosides.

Other suitable base polyols include polyphenols, such as the alkylene oxide adducts thereof, wherein the alkylene oxides have from 2 to 4 carbon atoms. Among the polyphenols which are suitable are, for example, bisphenol A, bisphenol F, condensation products of phenol and formaldehyde, novolac resins, condensation products of various phenolic compounds and acrolein, including the 1,1,3-tris (hydroxy-phenyl)propanes, condensation products of various phenolic compounds and glyoxal, glutaraldehyde, and/or other dialdehydes, including the 1,1,2,2-tetrakis (hydroxyphenol)ethanes.

The alkylene oxide adducts of phosphorus and polyphosphorus acid are also suitable base polyols. These include ethylene oxide, 1,2-epoxy-propane, the epoxybutanes, 3-chloro-1,2-epoxypropane as alkylene oxides. Phosphoric acid, phosphorus acid, polyphosphoric acids, such as tripolyphosphoric acid, and the polymetaphosphoric acids are suitable for use herein.

In some implementations, base polyol comprises any of the alkylene oxide reaction products described above (such as where propylene oxide and/or ethylene oxide are used as the alkylene oxide) wherein the content of ethylene oxide units in the base polyol is relatively low. For example, in some of these implementations, the base polyol comprises, based on the molecular weight of the base polyol, less than 30% by weight, such as no more than 28% by weight, no more than 25% by weight, no more than 20% by weight, or, in some cases, no more than 10% by weight or no more than 5% by weight, of ethylene oxide units.

Suitable ethylenically unsaturated compounds for use in the reaction mixture to produce the polymer polyol include, for example, aliphatic conjugated dienes, such as butadiene and isoprene; monovinylidene aromatic monomers, such as styrene, α-methyl-styrene, (t-butyl)styrene, chlorostyrene, cyanostyrene and bromostyrene; α,β-ethylenically unsaturated carboxylic acids and esters thereof, such as acrylic acid, methacrylic acid, methyl methacrylate, ethyl acrylate, 2-hydroxyethyl acrylate, butyl actylate, itaconic acid, and maleic anhydride; α,βethylenically unsaturated nitriles and amides, such as acrylonitrile, methacrylonitrile, acrylamide, methacrylamide, N,N-dimethyl acrylamide, and N-(dimethylaminomethyl)-acrylamide; vinyl esters, such as vinyl acetate; vinyl ethers; vinyl ketones; and vinyl and vinylidene halides, among others, including mixtures of any two or more thereof. In some embodiments, the ethylenically unsaturated monomer comprises at least one of styrene and its derivatives, acrylonitrile, methyl acrylate, methyl methacrylate, and vinylidene chloride.

In some embodiments, the ethylenically unsaturated compound comprises styrene and acrylonitrile. More specifically, in some implementations, styrene and acrylonitrile are used in sufficient amounts such that the weight ratio of styrene to acrylonitrile (S:AN) is within the range of 80:20 to 20:80, such as 75:25 to 25:75.

In some implementations, the pre-formed stabilizer used to produce the polymer polyol composition comprises the reaction product of a reaction mixture comprising: (a) a macromer that contains reactive unsaturation, (b) an ethylenically unsaturated compound, (c) a free radical initiator, (d) a polymer control agent; and, in some cases, (e) a diluent.

In some implementations, the macromer utilized to produce the pre-formed stabilizer comprises the reaction product of a reaction mixture comprising: (i) an H-functional starter having a functionality of 2 to 8 and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, such as 0.05 to 2.5% by weight, or 0.1 to 1.5% by weight, based on 100% by weight of the sum of components (i), (ii) and (iii), of a diisocyanate.

Suitable preformed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and recovering a mixture containing the preformed stabilizer dispersed in the polymer control agent.

Suitable starters for use in preparing the macromer include compounds having a hydroxyl functionality of 2 to 8, such as 3 to 6, and a hydroxyl number of, for example, 20 to 50 mg KOH/g, such as 25 to 40 mg KOH/g. A specific example of a suitable starter is an alkylene oxide adduct of a hydroxyl functional compound, such as ethylene glycol, propylene glycol, diethylene glycol, dipropylene glycol, tripropylene glycol, glycerin, trimethylolpropane, pentaerythritol, sorbitol, ethylenediamine, and toluene diamine, among others, including mixtures of any two or more thereof, in which the alkylene oxide comprises, for example, propylene oxide, ethylene oxide, butylene oxide, or styrene oxide, among others, including mixtures of any two or more thereof. When a mixture of alkylene oxides are used to form the starter, a mixture of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possible to use a combination of simultaneous and sequential addition of alkylene oxides. In one embodiment, an alkylene oxide such as propylene oxide may be added first, and then a second alkylene oxide such as ethylene oxide added as a cap.

Other examples of suitable starters for preparing the macromer are polyoxyethylene glycols, triols, tetrols and higher functionality polyols, and mixtures thereof, as well as alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, and alkylene oxide adducts of polyhydroxyalkanes other than those described above. Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, and mannitol. Specific examples of alkylene oxide adducts of non-reducing sugars, include those where the alkoxides have from 2 to 4 carbon atoms. Non-reducing sugars and sugar derivatives include sucrose, alkyl glycosides, such as methyl glycoside and ethyl glucoside, glycol glucosides, such as ethylene glycol, glycoside, propylene glycol glucoside, glycerol glucoside, and 1,2,6-hexanetriol glucoside, and alkylene oxide adducts of the alkyl glycosides. Other suitable polyols starters for preparing the macromer include polyphenols, such as alkylene oxide adducts thereof, wherein the alkylene oxides have from 2 to 4 carbon atoms. Suitable polyphenols include, for example, bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes.

In some implementations, the starter used to prepare the macromer has a functionality of from 3 to 6 and a hydroxyl number of from 25 to 40 mg KOH/g, and is prepared by reacting a starter such as glycerin, trimethylolpropane, pentaerythritol, dipentaerythritol, sorbitol, mannitol, or a mixture of any two or more thereof, with an alkylene oxide comprising at least one of propylene oxide and/or ethylene oxide. In some of these embodiments, ethylene oxide is utilized in an amount of 1 to 40% by weight, such as 5 to 30% by weight or 10 to 25% by weight, based on the total weight of the starter compound. In some embodiments, all or a portion of the ethylene oxide is added as a cap on the end of the starter compound. Suitable amounts of ethylene oxide to be added as a cap range from, for example, 1 to 40% by weight, such as 3 to 30% by weight or 5 to 25% by weight, based on the total weight of starter.

In some implementations, however, the macromer is not a polar polymer, i.e., it is not rich in ethylene oxide, nor does it have polar functional groups incorporated therein.

As indicated earlier, in some implementations, the reaction mixture used to produce the macromer utilized to produce the pre-formed stabilizer also comprises a hydroxyl-reactive compound that contains reactive unsaturation. Suitable such compounds include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, and adducts of toluenediisocyanate and 2-hydroxypropyl acrylate, among others, including mixtures of any two or more thereof.

As also indicated earlier, in some implementations, the reaction mixture used to produce the macromer utilized to produce the pre-formed stabilizer may also comprise a diisocyanate. Suitable diisocyanates include various isomers of diphenylmethane diisocyanate and isomeric mixtures of diphenylmethane diisocyanate, such as, for example, mixtures of 2,4'-diphenylmethane diisocyanate, 4,4'-diphenylmethane diisocyanate and/or 2,2'-diphenyl-methane diisocyanate. Other suitable isocyanates include toluenediisocyanate, isophoronediisocyanate, hexamethylenediisocyanate, and 4,4'-methylenebis(cyclohexyl isocyanate), among others, includes mixtures of any two or more thereof.

In certain implementations, the macromer is used in an amount of 10 to 40% by weight, such as 15 to 35% by weight, based on the total weight of the reaction mixture used to produce the pre-formed stabilizer.

As previously mentioned, in some implementations, the reaction mixture used to form the pre-formed stabilizer used to produce the polymer polyol also comprises an ethylenically unsaturated compound. Suitable such ethylenically unsaturated compounds are aliphatic conjugated dienes, such as butadiene and isoprene; monovinylidene aromatic monomers, such as styrene, α-methylstyrene, (t-butyl)styrene, chlorostyrene, cyanostyrene and bromostyrene; α,βethylenically unsaturated carboxylic acids and esters thereof, such as acrylic acid, methacrylic acid, methyl methacrylate, ethyl acrylate, 2-hydroxyethyl acrylate, butyl acrylate, itaconic acid, and maleic anhydride; α,β-ethylenically unsaturated nitriles and amides, such as acrylonitrile, methacrylonitrile, acrylamide, methacrylamide, N,N-dimethyl acrylamide, and N-dimethylaminomethyl)acryl-amide; vinyl esters, such as vinyl acetate; vinyl ethers; vinyl ketones; vinyl and vinylidene halides, as well as a wide variety of other ethylenically unsaturated materials which are copolymerizable with the macromer, including mixtures of any two or more thereof.

In some implementations, the reaction mixture used to form the pre-formed stabilizer used to produce the polymer polyol comprises an ethylenically unsaturated monomer comprising a mixture of acrylonitrile and at least one other ethylenically unsaturated comonomer which is copolymerizable with acrylonitrile, such as, for example, styrene and its derivatives, acrylates, methacrylates, such as methyl methacrylate, vinylidene chloride, among others, as well as mixtures of any two or more thereof. When using acrylonitrile with a comonomer, it is sometimes desirable that a minimum of 5 to 15% by weight acrylonitrile be maintained. One specific ethylenically unsaturated monomer mixture suitable for making the preformed stabilizer comprises mixtures of acrylonitrile and styrene in which, for example, acrylonitrile is used in an amount of 20 to 80% by weight, such as 30 to 70% by weight, based on the total weight of the monomer mixture, and styrene is used in an amount of 80 to 20% by weight, such as 70 to 30% by weight percent, based on the total weight of the monomer mixture.

In certain implementations, the ethylenically unsaturated compound is used in an amount of 10 to 30% by weight, such as 15 to 25% by weight, based on the total weight of the reaction mixture used to produce the pre-formed stabilizer.

The reaction mixture used to produce the pre-formed stabilizer, in certain implementations, also include a free radical initiator. Exemplary suitable free-radical initiators include peroxides, including both alkyl and aryl hydroperoxides, persulfates, perborates, percarbonates, and azo compounds. Some specific examples include hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile). In some cases, the catalyst selected has a half-life that is 25 percent or less of the residence time in the reactor at a given temperature. Representative examples of useful initiators species include t-butyl peroxy-2-ethylhexanoate, t-butylperpivalate, t-amyl peroctoate, 2,5-dimethyl-hexane-2,5-di-per-2-ethyl hexoate, t-butylperneodecanoate, and t-butylperbenzoate, as well as azo compounds, such as azobis-isobutyronitrile, 2,2'-azo bis-(2-methylbutyro-nitrile), and mixtures thereof.

In some implementations, the free radical initiator is used in an amount of 0.01 to 2% by weight, such as 0.05 to 1% by weight or 0.05 to 0.3% by weight, based on the total weight of the reaction mixture used to produce the pre-formed stabilizer.

The reaction mixture used to produce the pre-formed stabilizer, in certain implementations, also includes a polymer control agent. Suitable polymer control agents include various mono-ols (i.e. monohydroxy alcohols), aromatic hydrocarbons, and ethers. Specific examples of suitable polymer control agents are alcohols containing at least one carbon atom, such as methanol, ethanol, n-propanol, isopropanol, n-butanol, sec-butanol, t-butanol, n-pentanol, 2-pentanol, 3-pentanol, and the like, and mixtures of any two or more thereof. Other suitable polymer control agents include ethylbenzene and toluene. The polymer control agent can be used in substantially pure form (i.e. as commercially available) or can be recovered in crude form from the polymer polyol production process and reused as-is. For instance, if the polymer control agent is isopropanol, it can be recovered from the polymer polyol process and used at any point in a subsequent product campaign in which the isopropanol is present.

In certain implementations, the polymer control agent is used in an amount of 30 to 80% by weight, such as 40 to 70% by weight, based on the total weight of the reaction mixture used to produce the pre-formed stabilizer.

As previously indicated, the reaction mixture used to produce the pre-formed stabilizer, in certain implementations, may also include a diluent. Suitable diluents include, for example, polyols, hydrocarbons, ethers, and mixtures of any two or more thereof, specific examples of which include, but are not limited to, methanol, isopropanol, toluene, ethylbenzene, polyether polyols, and mixtures of any two or more thereof. In some implementations, the diluent is the same as or equivalent to the polyol used in the formation of precursor used to prepare the preformed stabilizer. In certain implementations, the diluent is used in an amount of 0 to 40% by weight, such as 0 to 20% by weight, or, in some cases, 0 to 10% by weight, based on the total weight of the reaction mixture used to produce the pre-formed stabilizer.

The preformed stabilizer can be produced by a process similar to that of making the polymer polyol. The temperature range is not critical and may vary from, for example, 80° C. to 150° C., such as 115° C. to 125° C. The mixing conditions employed can, for example, be those obtained using a back mixed reactor (e.g.—a stirred flask or stirred autoclave).

As indicated earlier, the reaction mixture used to produce certain implementations of the polymer polyol also comprises a free radical initiator, particularly where the polymer particles are the free radical polymerization reaction product of an ethylenically unsaturated compound. Suitable such free-radical initiators include, for example, any of those described previously with respect to the production of the preformed stabilizer. In certain implementations, the free-radical initiator is present in the reaction mixture used to produce the polymer polyol in an amount of 0.01 to 2% by weight, based on 100% by weight of the final polymer polyol.

In some implementations, the reaction mixture used in preparing the polymer polyol further comprises a chain transfer agent. Examples of suitable chain transfer agents are mercaptans, such as dodecane thiol, ethane thiol, octane thiol, and toluene thiol, halogenated hydrocarbons, such as carbon tetrachloride, carbon tetrabromide, and chloroform, amines, such as diethylamine, and enol-ethers. In some cases, if used, the chain transfer agent is used in an amount of 0.1 to 2% by weight, such as 0.2 to 1% by weight, based on the total weight of the reaction mixture used to produce the polymer polyol.

The polymer polyol can be made using any process (including continuous and semi-batch) and reactor configuration that is known to be suitable to prepare polymer polyols, such as, for example, a two-stage reaction system comprising a continuously-stirred tank reactor (CSTR) fitted with impeller(s) and baffles (first-stage) and a plug-flow reactor (second stage). Furthermore, the reaction system can utilize a wide range of mixing conditions. The reaction system may be characterized by energy inputs of from 0.5 to 350 horsepower per 1000 gallons, such as 2 to 50 horsepower per 1000 gallons on average for the bulk phase volume of each reactor as a particularly useful mixing power input. Mixing can be provided by any combination of impeller(s) and pump-around loop/jet mixing. In addition, the polymer polyols can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, and Maxflow propeller. For a continuous production process to prepare polymer polyols, a residence time ranging of 20 to 180 minutes for the first reactor may be particularly useful.

In some implementations, the reactants are pumped from feed tanks through an in-line static mixer, and then, through a feed tube into the reactor. It may be particularly useful to prepare a premix of the initiator with part of the polyol stream, as well as of polyol and stabilizer. In general, feed stream temperatures are ambient (i.e. 25° C.). However, if desired, feed streams can be heated prior to mixing and entering the reactor. Another process condition that may be useful is cooling of the feed tube in the reactor. Furthermore, the suitable reaction conditions for polymer polyols in general may be characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling.

In many cases, the polymer polyols are produced by utilizing a low monomer to polyol ratio which is maintained throughout the reaction mixture during the process. This can be achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol. The temperature range is not critical and may vary from, for example, 80° C. to 200° C., 100° C. to 140° C., or, in some cases, 115° C. to 125° C.

One suitable continuous process for making polymer polyols as described above comprises (1) providing a heterogenous mixture of the preformed stabilizer and, optionally, liquid diluent, in combination with a polyol, a free radically polymerizable ethylenically unsaturated compound, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated compound to form a heterogenous mixture containing the enhanced polymer polyol, unreacted monomers and diluent, and stripping the unreacted monomers and diluent from the enhanced polymer polyol to recover the unreacted monomers and diluent.

In some implementations, the polymer particles (whether individual particles or agglomerates of individual particles) are relatively small in size and, in some cases, have a weight average diameter less than ten microns.

As indicated, the polymer polyol utilized in the inventions of this specification have an OH number of greater than 260 mg KOH/g, such as at least 280 mg KOH/g, at least 290 mg KOH/g or at least 300 mg KOH/g. The polymer polyols may also have an OH number of no more than 1000 mg KOH/g, no more than 800 mg KOH/g, no more than 600 mg KOH/g, no more than 500 mg KOH/g or no more than 400 mg KOH/g.

In addition, in some implementations, the polymer polyol may be present in the polyol premix of this specification in an amount of at least 30% by weight, such as at least 35% by weight, or, in some cases, at least 40% by weight, based on the total weight of the polyol composition. In some of these implementations, the polymer polyol is also present in an amount of no more than 80% by weight, such as no more than 70% by weight, or, in some cases, no more than 60% by weight, based on the total weight of the polyol composition.

In fact, it was discovered, surprisingly, that when utilizing a polymer polyol that has an OH number of greater than 260 mg KOH/g in certain polyol premixes of the type described in this specification, it was possible to produce phase-stable polyol premixes (meaning that there was no visible separation of the polymer polyol physical blowing agent from the rest of the premix) that were capable of producing hydrocarbon-blown rigid polyurethane foams with significantly improved thermal insulation properties, i.e., K-factor reduction of 2% or more relative to a control formulation, all the while maintaining or even further improving other important physical and processing properties, such as compressive strength, dimensional stability, flow, reactivity and/or de-mold characteristics.

The polyol premixes of this specification may, and often do, comprise other polyols besides the foregoing polymer polyols.

For example, in some implementations, the polyol premix comprises an aromatic amine-initiated polyether polyol. Such aromatic amine-initiated polyether polyols can have a functionality of, for example, at least 2, such as 2 to 6, 3 to 5, 3.5 to 4.5 or 3.8 to 4.2 or 3.8 to 4.0. In certain implementations, the aromatic amine-initiated polyether polyol has a number average molecular weight of 200 Da to 12,000 Da, such as 200 Da to 1,500 Da, 200 Da to 1,000 Da, 400 Da to 800 Da, 500 Da to 700 Da, or 500 Da to 600 Da. In some embodiments, the aromatic amine-initiated polyether polyol has a hydroxyl number of 300 to 500 mg KOH/g, 350 to 450 mg KOH/g, or, in some cases, 380 to 420 mg KOH/g.

Such aromatic amine-initiated polyether polyols may, in some implementations, be the alkoxylation reaction product of a reaction mixture comprising a polyol starter comprising predominantly an aromatic amine, such as an aromatic diamine, with an alkylene oxide, which, in some implementations, may comprise predominantly propylene oxide.

As used herein, when it is stated that a polyol starter comprises "predominantly" an aromatic amine, it means that the aromatic amine starter is used in an amount of greater than 50% by weight, based on the total weight of polyol starter used to produce the polyether polyol. In some implementations, the polyol starter consists essentially of, or, in some cases, consists of, an aromatic amine (such as an aromatic diamine). As used herein, when it is stated that a polyol starter "consists essentially of" an aromatic amine, it means that the aromatic amine starter is used in an amount of greater than 90% by weight, in some cases, at least 95% by weight, or, in yet other cases, at least 99% by weight, based on the total weight of polyol starter used to produce the polyether polyol. As used herein, when it is stated that the polyol starter "consists of" an aromatic amine, it means that the aromatic amine starter is 100% of the polyol starter used to produce the polyether polyol.

Suitable aromatic amine starters can be monomeric or polymeric and can have primary amine and/or secondary amine functional groups. For example, a primary amine, R—$NH_2$ reacts with epoxides to give two hydroxyl groups. For example, $RNH_2$ can react with 2 moles of propylene oxide to yield HO—$CH_2CH_2CH_2$—NR—$CH_2CH_2CH_2$—OH. Therefore, an amine functionality of 1 in this case gives a polyol functionality of 2 and a diamine with 2 primary amine groups gives a polyol functionality of 4. Examples of suitable aromatic amines include, but are not limited to, crude toluene diamine obtained by the nitration of toluene followed by reduction, 2,3-toluene diamine, 3,4-toluene diamine, 2,4-toluene diamine, and 2,6-toluene diamine or mixtures thereof, 4,4'-methylene dianiline, methylene-bridged polyphenyl polyamines composed of isomers of methylene dianilines and triamines, and or polyamines of higher molecular weight prepared by reacting aniline with formaldehyde, as well as mixtures of any two or more of the foregoing.

If desired, in addition to the aromatic amine starter, other H-functional starters may be used in the production of an aromatic amine-initiated polyether polyol suitable for use in the polyol premixes of this specification. In some implementations, for example, one or more additional hydroxyl and/or amine functional starters may be employed. In some implementations, for example, such additional starter(s) may comprise trimethylolethane, trimethylolpropane, glycerol, pentaerythritol, 4,4'-dihydroxydiphenyl-propane, sorbitol, sucrose, ethylenediamine, monoethanolamine, diethanolamine, methyl amine, ethylene diamine, diethylene triamine, triethylene tetramine, triethanolamine, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, ammonia, aniline, ethanolamine, triethanolamine, and ethylene diamine, or a mixture of any two or more of the foregoing. Oligomeric and/or polymeric polyols, such as polyether polyols, are also suitable starters, as are Mannich reaction products of phenol or substituted phenols with alkanol amines and formaldehyde or paraformaldehyde.

In some implementations, however, the aromatic amine, such as aromatic diamine, such as a toluene diamine (such as ortho-toluene diamine) starter is present in an amount of more than 50% by weight, in some cases, at least 80% by weight, at least 90% by weight, or, in yet other cases, at least 98% by weight or at least 99% by weight, based on the total weight of H-functional initiator used to prepare the aromatic amine-initiated polyether polyol.

To produce certain aromatic amine-initiated polyols suitable for use in implementations of the inventions of this specification, the starter is alkoxylated with an alkylene oxide. As indicated earlier, in some implementations, the alkylene oxide comprises predominantly propylene oxide.

As used herein, when it is stated that the alkylene oxide comprises "predominantly" propylene oxide, it means that the propylene oxide is used in an amount of greater than 50% by weight, based on the total weight of alkylene oxide used to produce the polyether polyol.

If desired, in addition to the propylene oxide, other alkylene oxides may be used. Suitable alkylene oxides include, for example, ethylene oxide, butylene oxide, styrene oxide, epichlorohydrin, as well as mixtures of any two or more thereof. If more than one type of alkylene oxide, is used, they can be used sequentially or simultaneously.

Suitable aromatic amine-initiated polyether polyols are commercially available and processes for producing such aromatic amine-initiated polyether polyols are known to those skilled in the art.

In certain implementations, an aromatic-amine initiated polyether polyol is present in an amount of 10 to 40% by weight, such as 20 to 40% by weight or 25 to 35% by weight, based on the total weight of polyols in the polyol composition.

In addition, the inventions of this specification may, in some implementations, comprise an aromatic polyester polyol. Suitable aromatic polyester polyols include, for example, the reaction product of an aromatic diacid or anhydride with a suitable glycol or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, or phthalic anhydride. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT-5100 and HT-5500, or from Coim under the Isoexter trade name such as Isoexter® TB-265.

In certain implementations, the aromatic polyester polyol has an OH number of 150 to 410 mg KOH/g, such as 150 to 360 mg KOH/g, such as 200 to 335 mg KOH/g, or, in some cases, 200 to 250 mg KOH/g, and a functionality of 1.5 to 3, such as 1.9 to 2.5.

In some implementations, the aromatic polyester polyol is utilized in an amount of 1 to 40% by weight, such as 5 to 20% by weight, based upon the total weight of the polyol compositions. In some implementations, however, the polyol premix is substantially or, in some cases, completely free of any aromatic polyester polyol.

Further, in some implementations, the inventions of this specification may comprise a saccharide-initiated polyether polyol. As used herein, "saccharide-initiated polyether polyol" refers to a polyether polyol prepared by reacting an alkylene oxide with a starter in the presence of a suitable catalyst, in which the starter comprises a saccharide. Examples of suitable alkylene oxides include ethylene oxide, propylene oxide, butylene oxide, styrene oxide, and epichlorohydrin, as well as mixtures of two or more thereof. Some examples of suitable saccharides are sucrose, sorbitol, and maltitol, as well as other mono-saccharides, di-saccharides, tri-saccharides and polysaccharides. Other initiators are often used in combination with the saccharide to prepare the saccharide-initiated polyether polyol. Saccharides can be co-initiated with for example, water, propylene glycol, glycerin, ethylene glycol, ethanol amines, and diethylene glycol, as well as mixtures of any two or more thereof. As will be appreciated, a wide variety of individual initiators may be used in combination with one another in which the functionality of an individual initiator does not fall within the functionalities set forth herein, provided that the average functionality of the mixture of initiator satisfies the overall functionality range disclosed herein.

In some implementations, the saccharide, such as sucrose, is first reacted with ethylene oxide and then propylene oxide. In some cases, the ethylene oxide is used in an amount of 10 to 50%, such as from 20 to 40%, by weight of the total alkylene oxide used and the propylene oxide is used in an amount of from 50 to 90%, such as 60 to 80%, by weight of the total alkylene oxide used. In some implementations, the total amount of alkylene oxide used is selected so that the product has an average molecular weight of 300 to 1600, such as 440 to 1000.

In some implementations, the saccharide initiated polyether polyol has an OH number of from 200 to 600 mg KOH/g, such as 300 to 550 mg KOH/g, such as 400 to 500 mg KOH/g, or, in some cases, 450 to 500 mg KOH/g, and a functionality of 4 to 6, such as 5 to 6, 5.2 to 5.8, or 5.4 to 5.6.

In some implementations, the saccharide-initiated polyether polyol is utilized in an amount of 10 to 45% by weight, 10 to 30% by weight, such as 15 to 25% by weight, based on the total weight of the polyols in the polyol composition.

In some implementations, the polyol premix may comprise an aliphatic triol-initiated polyether polyol having an OH number of 100 to 500 mg KOH/g, such as 200 to 400 mg KOH/g, 200 to 300 mg KOH/g, 200 to 250 mg KOH/g, 230 to 250 mg KOH/g or 233 to 243 mg KOH/g, and a functionality of from greater than 2 to 4, such as 2.5 to 3.5, or, in some cases, 3.0.

Such polyether polyols can be prepared by reacting suitable aliphatic divalent, trivalent and/or more valent alcohols, (e.g., ethanediol, propanediol-1,2 and propanediol-1,3, diethylene glycol, dipropylene glycol, butanediol-1,4, hexanediol-1,6, and glycerin), provided that at least one trivalent alcohol is used. In some embodiments, the polyvalent alcohol starter comprises or, in some cases, consists of glycerin and the alkylene oxide comprises, or, in some cases, consists of propylene oxide.

In certain implementations, the aliphatic triol-initiated polyether polyol is utilized in an amount of 1 to 20% by weight, such as 5 to 20% by weight, or 10 to 20% by weight, based on the total weight of the polyols in the polyol composition.

In addition, the inventions of this specification may, in some cases, include an alkanolamine-initiated polyether polyol. As used herein, "alkanolamine-initiated polyether polyol" refers to a polyether polyol prepared by reacting an alkylene oxide with one or more suitable initiators in the presence of a suitable catalyst, in which the initiator comprises one or more alkanolamines. Suitable catalysts including basic catalysts (such as sodium or potassium hydroxide or tertiary amines such as methyl imidazole) and DMC catalysts. In the inventions described herein, each of the recited polyether polyols, including the "alkanolamine-initiated polyether polyol" and the "aromatic amine-initiated polyether polyol", are different from each other.

As used herein, the term "alkanolamine" refers to compounds represented by the formula:

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

where each R represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Suitable alkylene oxides include ethylene oxide, propylene oxide, butylene oxide, styrene oxide, and epichlorohydrin, as well as mixtures of any two or more thereof.

In some implementations, the alkanolamine-initiated polyether polyol has an OH number of at least 500 mg KOH/g, such as 500 to 900 mg KOH/g, 600 to 800 mg KOH/g, or, in some cases, 680 to 720 mg KOH/g, and a functionality of 2.5 to 4, such as 2.5 to 3.5.

In some implementations, the alkanolamine-initiated polyether polyol is utilized in an amount of 1 to 20%, such as 1 to 10% by weight or 2 to 10% by weight, based upon the total weight of the polyol composition.

If desired, the polyol premixes of this specification may include additional compounds that contain isocyanate-reactive groups, such as chain extenders and/or crosslinking agents, and other polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine, as well as mixtures of any two or more thereof. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

As indicated earlier, the inventions of this specification also comprise a physical blowing agent composition that comprises a hydrocarbon. Suitable hydrocarbons for use as part of the physical blowing agent composition include, without limitation, butane, n-pentane, cyclopentane, hexane, and/or isopentane (i.e. 2-methylbutane). In some implementations, the hydrocarbon blowing agent, such as cyclopentane, n-pentane and/or isopentane, is utilized in an amount of at least 10% by weight, such as 10 to 30% by weight or 10 to 20% by weight, based on the total weight of the polyol premix. The hydrocarbon is present in an amount of at least 50% by weight, in some cases at least 70% by weight, at least 80% by weight, at least 90% by weight, at least 95% by weight, or, in some cases, at least 98% by weight, based on the total weight of the physical blowing agent composition.

In some implementations, other physical blowing agents (in addition to the foregoing hydrocarbon blowing agent) may be present, such as halogenated blowing agents, such as CFCs, HCFCs, HFCs and/or HFOs, such as HCFOs. For example, suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

In certain implementations, the polyol premix comprises one or more other physical blowing agents, such as CFCs, HCFCs, HFCs and/or HFOs. In other embodiments, the isocyanate-reactive composition is substantially or, in some cases, completely free of such other physical blowing agents (such as other halogenated blowing agents, such as CFCs, HCFCs, HFCs and/or HFOs). As used herein, the term "substantially free" when used with reference to these blowing agents, means that the blowing agent is present, if at all, in an amount of less than 10% by weight, such as less than 1% by weight, based on the total weight of the physical blowing agent composition.

As indicated above, the inventions of this specification comprise a carbon dioxide generating chemical blowing agent, such as water and/or a formate-blocked amine. In some of these implementations, the carbon dioxide generating chemical blowing agent, such as water, is utilized in an amount of from 0.5 to 5.0% by weight, such as 1 to 4% by weight, or 1.0 to 3.0% by weight, or 2.0 to 3.0% by weight, based on the total weight of the polyol premix.

In certain implementations, the physical blowing agent composition comprises a hydrocarbon, such as cyclopentane and/or isopentane, and a carbon dioxide generating chemical blowing agent, such as water, wherein the hydrocarbon and the carbon dioxide generating chemical blowing agent are present in an amount of at least 90% by weight, such as at least 95% by weight, or, in some cases, at least 99% by weight, based on the total weight of the blowing agent composition. In certain implementations, the hydrocarbon and a carbon dioxide generating chemical blowing agent are present in the blowing agent composition at a weight ratio of at least 2:1, such as at least 4:1, such as 4:1 to 10:1 or 4:1 to 6:1.

As also indicated, the inventions of this specification, in certain implementations, also comprise a catalyst. Suitable catalysts include tertiary amines, tertiary phosphines, metal chelates, acid metal salts, strong bases, various metal alcoholates and phenolates, and metal salts of organic acids. In some implementations, the catalyst includes an organotin catalyst and/or tertiary amine catalyst, which may be used singly or in some combination. For example, a combination of at least one "blowing" catalyst, which strongly promotes the reaction of an isocyanate group with a water molecule to form carbon dioxide, and either at least one "gelling" catalyst, which strongly promotes the reaction of an alcohol group with an isocyanate to form the urethane, or at least one trimerization catalyst, may be used.

Specific examples of suitable tertiary amine catalysts include: pentamethyldiethylenetriamine, N,N-dimethylcyclohexylamine, N,N',N''-tris(3-dimethylaminopropyl-)hexahydrotriazine, tetramethylethylenediamine, tetraethylene diamine and benzyldimethylamine, and N,N',N'-dimethylaminopropyl-hexahydrotriazine. In some implementations, tertiary amine catalyst comprises a morpholine and/or an imidazole. Suitable morpholine catalysts include, for example, dimorpholinodiethylether, dimorpholinodimethylether N-ethylmorpholine, and N-methylmorpholine. Suitable imidazole catalysts include, for example, imidazole, n-methylimidazole, and 1,2-dimethylimidazole. Specific examples of suitable organometallic catalysts include dibutyltin dilaurate, dibutyltin diacetate, stannous octoate, potassium octoate, and potassium acetate.

In some implementations, the catalyst is present in an amount of 0.01 to 3.0% by weight, or 0.3 to 2.5% by weight, based on the total weight of the polyol premix.

In some implementations, the inventions of this specification also comprise a surfactant. Any suitable surfactant can be used, including organosilicon compounds, such as polysiloxane-polyalkyene-block copolymers, such as a polyether-modified polysiloxane. Useful surfactants also include polyethylene glycol ethers of long chain alcohols, tertiary amine or alkanolamine salts of long chain alkyl acid sulfate esters, alkylsulfonic esters, or alkylarylsulfonic acids. In some cases, surfactant is utilized in an amount of 0.2 to 5.0% by weight, such as 1 to 3% by weight, based on the total weight of the polyol premix.

Additional materials which may optionally be included in the inventions of this specification include: pigments, colorants, fillers, antioxidants, flame retardants, and stabilizers. Exemplary useful flame retardants include, but are not limited to, reactive bromine based compounds and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane foams. In such processes, an organic isocyanate is reacted with a polyol, which may, for example, be present in a polyol premix of the type described above. In some implementations, the isocyanate functional component and the polyol are mixed at an isocyanate index of 90 to 150, such as 120 to 150.

In certain implementations, the polyol is reacted with an organic polyisocyanate in the presence of the blowing agent composition and the catalyst composition, as well as any surfactant or other optional ingredients. The rigid foams may be prepared by forming a polyol premix as described herein and then mixing this in the proper ratio with the organic polyisocyanate. Alternatively, one or more of the components, such as the surfactant, may be combined with the organic polyisocyanate prior to mixing it with the polyol. Other possible implementations would include adding one or more of the components as a separate stream, together with the polyol.

Many foam machines are designed to condition and mix only two components in the proper ratio. For use of these machines, a polyol premix of the type described in this specification can be advantageously employed. According to the two-component method (component A: polyisocyanate; and component B: polyol premix), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the polyurethane foam-forming mixture, but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, surfactants, and water. Other additives may be added to either the isocyanate prepolymer or remaining polyol or both prior to the mixing of the components, whereby at the end of the reaction, rigid polyurethane foam is provided.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

As a result, embodiments of this specification are also directed to closed-celled, rigid polyurethane foams that comprise the reaction product of a mixture comprising: (a) a polyisocyanate; (b) a polyol composition comprising a polymer polyol having an OH number of greater than 260 mg KOH/g; (c) a catalyst; (d) a physical blowing agent composition comprising at least 50% by weight, based on the total weight of the physical blowing agent composition, of a hydrocarbon; and (e) a carbon dioxide generating chemical blowing agent. Still other embodiments of this specification are directed to methods for making a closed-celled, rigid polyurethane foam, the methods comprise reacting a polyisocyanate with a polyol composition comprising a polymer polyol having an OH number of greater than 260 mg KOH/g at, for example, an isocyanate index of from 90 to 150, such as 120 to 150 in the presence of a catalyst, a physical blowing agent composition comprising at least 50% by weight, based on the total weight of the physical blowing agent composition, of a hydrocarbon, and a carbon dioxide generating chemical blowing agent.

For closed-cell insulating foams, the object is to retain the blowing agent in the cells. Thus, high closed-cell content in the foam is desirable. Foams produced according to implementations of the present specification have more than 80 percent, typically more than 85 percent, or more than 88 percent closed-cell content as measured according to ASTM D6226-15. Furthermore, the thermal conductivity of foams produced according to various implementations of the present specification indicates that the foams have acceptable insulating properties, i.e., the foams have a thermal conductivity measured at 35° F. (2° C.) of less than 0.150 BTU-in/h-ft$^2$-° F., in some cases less than 0.130 BTU-in/h-ft$^2$-° F. and measured at 75° F. (24° C.) of less than 0.160 BTU-in/h-ft$^2$-° F. in some cases less than 0.140 BTU-in/h-ft$^2$-° F., for foam from the core of 2-inch thick panels, as measured according to ASTM C518-15.

This specification also relates to the use of the rigid polyurethane foams described herein for thermal insulation. That is, the rigid polyurethane foams of the present specification may find use as an insulating material in refrigeration apparatuses since the combination of good thermal insulation and other properties described herein is particularly appropriate here. The rigid foams according to this specification can be used, for example, as an intermediate layer in composite elements or for filling hollow spaces of refrigerators and freezers, or refrigerated trailers. The foams may also find use in the construction industry or for thermal insulation of long-distance heating pipes and containers.

As such, the present specification also provides a composite article comprising rigid polyurethane foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the polyurethane foams produced according to the present specification in sandwich composites for trailer floors.

The particular isocyanate-reactive compositions described herein can be particularly suitable for use in discontinuous open pour applications, such as is often used in the production of discontinuous panels or doors. As will be appreciated, in such a discontinuous process, the reaction mixture (the mixture of the isocyanate-reactive component and the isocyanate-functional component) is poured into a cavity of a mold of the desired part, in which the cavity may be lined with a facer, which can be a metal sheet, particle board, plaster board, fiber cement, or a plastic. The foam adheres to the facers as it reacts and cures. The resulting faced panel is then removed from the cavity. To be effectively used in such a process, the reaction mixture must exhibit the right level of reactivity (sufficient to allow for adequate flow of the mixture) resulting from an ideal balance of blow and gel reactivity. Furthermore, lower foaming pressures are often desirable for this process due to restrictions presented by the manufacturing equipment in addition to any potential improvements in demold performance. As a result, certain implementations of the present specification are directed to the use of the reaction mixtures described herein in such a process.

Various aspects of the subject matter described herein are set out in the following numbered clauses:

Clause 1. A polyol premix comprising: (a) a polyol composition comprising a polymer polyol having an OH number of greater than 260 mg KOH/g; (b) a catalyst; (c) a physical blowing agent composition comprising at least 50% by weight, based on the total weight of the physical blowing agent composition, of a hydrocarbon; and (d) a carbon dioxide generating chemical blowing agent.

Clause 2. The polyol premix of clause 1, wherein the polymer polyol has a solids content of 20% to 65% by weight, 20% to 60% by weight, or 20% to 50% by weight, based on the total weight of the polymer polyol.

Clause 3. The polyol premix of clause 1 or clause 2, wherein the polymer polyol comprises polymer particles comprising a free radical polymerization reaction product of an ethylenically unsaturated compound, such as a reaction product of a reaction mixture comprising: (a) a base polyol; (b) an ethylenically unsaturated compound, (c) optionally a preformed stabilizer, and (d) a free radical initiator.

Clause 4. The polyol premix of clause 3, wherein the base polyol comprising a polyether polyol having a functionality of 2 to 6, 2 to 5 or 3 to 5, and an OH number of at least 200 mg KOH/g, at least 300 mg KOH/g, 300 to 1000 mg KOH/g, 300 to 800 mg KOH/g, 300 to 600 mg KOH/g, 300 to 500 mg KOH/g or 300 to 400 mg KOH/g.

Clause 5. The polyol premix of clause 3 or clause 4, wherein the base polyol is derived from an alkylene oxide in which the content of ethylene oxide units in the base polyol, based on the total weight of the base polyol, is less than 30% by weight, no more than 28% by weight, no more than 25% by weight, no more than 20% by weight, no more than 10% by weight or no more than 5% by weight.

Clause 6. The polyol premix of one of clause 3 to clause 5, wherein the ethylenically unsaturated compounds comprises an aliphatic conjugated diene, such as butadiene and isoprene; a monovinylidene aromatic monomer, such as styrene, α-methyl-styrene, (t-butyl)styrene, chlorostyrene, cyanostyrene and bromostyrene; an α,β-ethylenically unsaturated carboxylic acid or ester thereof, such as acrylic acid, methacrylic acid, methyl methacrylate, ethyl acrylate, 2-hydroxyethyl acrylate, butyl actylate, itaconic acid, and maleic anhydride; an α,β-ethylenically unsaturated nitrile and/or amide, such as acrylonitrile, methacrylonitrile, acrylamide, methacrylamide, N,N-dimethyl acrylamide, and N-(dimethylaminomethyl)-acrylamide; a vinyl ester, such as vinyl acetate; a vinyl ether; a vinyl ketone; a vinyl and/or vinylidene halide, or a mixture of any two or more thereof, such as where the ethylenically unsaturated monomer comprises at least one of styrene and its derivatives, acrylonitrile, methyl acrylate, methyl methacrylate, and vinylidene chloride, such as where the ethylenically unsaturated compound comprises styrene and acrylonitrile, such as where styrene and acrylonitrile are present in amounts such that the weight ratio of styrene to acrylonitrile (S:AN) is 80:20 to 20:80 or 75:25 to 25:75.

Clause 7. The polyol premix of one of clause 3 to clause 6, wherein the pre-formed stabilizer comprises the reaction product of a reaction mixture comprising: (a) a macromer that contains reactive unsaturation, (b) an ethylenically unsaturated compound, (c) a free radical initiator, (d) a polymer control agent; and, in some cases, (e) a diluent, such as where the macromer comprises the reaction product of a reaction mixture comprising: (i) an H-functional starter having a functionality of 2 to 8 and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, such as 0.05 to 2.5% by weight, or 0.1 to 1.5% by weight, based on 100% by weight of the sum of components (i), (ii) and (iii), of a diisocyanate, such as where the macromer is not a polar polymer.

Clause 8. The polyol premix of one of clause 1 to clause 7, wherein the polymer polyol has an OH number of at least 280 mg KOH/g, at least 290 mg KOH/g or at least 300 mg KOH/g, such as where the polymer polyol also has an OH number of no more than 1000 mg KOH/g, no more than 800 mg KOH/g, no more than 600 mg KOH/g, no more than 500 mg KOH/g or no more than 400 mg KOH/g.

Clause 9. The polyol premix of one of clause 1 to clause 8, wherein the polymer polyol is present in an amount of at least 30% by weight, at least 35% by weight, or at least 40% by weight, based on the total weight of the polyol composition, such as where the polymer polyol is also present in an amount of no more than 80% by weight, no more than 70% by weight, or no more than 60% by weight, based on the total weight of the polyol composition.

Clause 10. The polyol premix of one of clause 1 to clause 9, wherein the polyol composition further comprises an aromatic amine-initiated polyether polyol, such as where the aromatic amine-initiated polyether polyol has a functionality of at least 2, 2 to 6, 3 to 5, 3.5 to 4.5, 3.8 to 4.2, or 3.8 to 4, and/or a number average molecular weight of 200 Da to 12,000 Da, 200 Da to 1,500 Da, 200 Da to 1,000 Da, 400 Da to 800 Da, 500 Da to 700 Da, or 500 Da to 600 Da, and/or a hydroxyl number of 300 to 500 mg KOH/g, 350 to 450 mg KOH/g, or 380 to 420 mg KOH/g.

Clause 11. The polyol premix of clause 10, wherein the aromatic amine-initiated polyether polyol comprises the alkoxylation reaction product of a reaction mixture comprising a polyol starter comprising predominantly an aromatic amine, such as an aromatic diamine, with an alkylene oxide comprising predominantly propylene oxide, such as where the aromatic amine, such as aromatic diamine, such as a toluene diamine (such as ortho-toluene diamine) starter is present in an amount of more than 50% by weight, at least 80% by weight, at least 90% by weight, at least 98% by weight or at least 99% by weight, based on the total weight of H-functional initiator used to prepare the aromatic amine-initiated polyether polyol.

Clause 12. The polyol premix of clause 10 or clause 11, wherein the aromatic-amine initiated polyether polyol is present in an amount of 10 to 40% by weight, 20 to 40% by weight or 25 to 35% by weight, based on the total weight of polyols in the polyol composition.

Clause 13. The polyol premix of one of clause 1 to clause 12, wherein the polyol composition comprises an aromatic polyester polyol, such as the reaction product of an aromatic diacid or anhydride with a glycol or triol, such as those having an OH number of 150 to 410 mg KOH/g, 150 to 360 mg KOH/g, 200 to 335 mg KOH/g, or 200 to 250 mg KOH/g, and a functionality of 1.5 to 3 or 1.9 to 2.5.

Clause 14. The polyol premix of clause 12, wherein the aromatic polyester polyol is present in an amount of 1 to 40% by weight or 5 to 20% by weight, based upon the total weight of the polyol composition.

Clause 15. The polyol premix of one of clause 1 to clause 12, wherein the polyol composition is substantially free or completely free of any aromatic polyester polyol.

Clause 16. The polyol premix of one of clause 1 to clause 15, wherein the polyol composition further comprises a saccharide-initiated polyether polyol, such as a saccharide-initiated polyether polyol having an OH number of from 200 to 600 mg KOH/g, 300 to 550 mg KOH/g, 400 to 500 mg KOH/g, or 450 to 500 mg KOH/g, and a functionality of 4 to 6, 5 to 6, 5.2 to 5.8, or 5.4 to 5.6.

Clause 17. The polyol premix of clause 16, wherein the saccharide-initiated polyether polyol is present in an amount of 10 to 45% by weight, 10 to 30% by weight, or 15 to 25% by weight, based on the total weight of the polyols in the polyol composition.

Clause 18. The polyol premix of one of clause 1 to clause 17, wherein the polyol composition further comprises an aliphatic triol-initiated polyether polyol, such as those having an OH number of 100 to 500 mg KOH/g, 200 to 400 mg KOH/g, 200 to 300 mg KOH/g, 200 to 250 mg KOH/g, 230 to 250 mg KOH/g or 233 to 243 mg KOH/g, and a functionality of from greater than 2 to 4, 2.5 to 3.5, or 3.0.

Clause 19. The polyol premix of clause 18, wherein the aliphatic-triol initiated polyether polyol is present in an amount of 1 to 20% by weight, such as 5 to 20% by weight, or 10 to 20% by weight, based on the total weight of the polyols in the polyol composition.

Clause 20. The polyol premix of one of clause 1 to clause 19, wherein the polyol composition comprises an alkanolamine-initiated polyether polyol, such as those having an OH number of at least 500 mg KOH/g, 500 to 900 mg KOH/g, 600 to 800 mg KOH/g, or 680 to 720 mg KOH/g, and a functionality of 2.5 to 4 or 2.5 to 3.5.

Clause 21. The polyol premix of clause 20, wherein the alkanolamine-initiated polyether polyol is present in an amount of 1 to 20%, 1 to 10%, or 2 to 10% by weight, based upon the total weight of the polyol composition.

Clause 22. The polyol premix of one of clause 1 to clause 21, wherein the hydrocarbon comprises n-pentane, cyclopentane, and/or isopentane, such as where cyclopentane, n-pentane, and/or isopentane, is present in an amount of at least 10% by weight, 10 to 30% by weight or 10 to 20% by weight, based on the total weight of the polyol premix.

Clause 23. The polyol premix of one of clause 1 to clause 22, wherein the hydrocarbon is present in an amount of at least 50% by weight, at least 70% by weight, at least 80% by weight, at least 90% by weight, at least 95% by weight, or, in some cases, at least 98% by weight, based on the total weight of the physical blowing agent composition.

Clause 24. The polyol premix of one of clause 1 to clause 23, wherein the carbon dioxide generating chemical blowing agent comprises water and/or a formate-blocked amine, such as where the carbon dioxide generating chemical blowing agent is present in an amount of 0.5 to 5.0% by weight, 1 to 4% by weight, 1.0 to 3.0% by weight, or 2.0 to 3.0% by weight, based on the total weight of the polyol premix.

Clause 25. The polyol premix of one of clause 1 to clause 24, wherein the physical blowing agent composition comprises a hydrocarbon, such as cyclopentane and/or isopentane, and the carbon dioxide generating chemical blowing agent comprises water, wherein the hydrocarbon and the water are present in an amount of at least 90% by weight, at least 95% by weight, or at least 99% by weight, based on the total weight of the blowing agent composition.

Clause 26. The polyol premix of one of clause 1 to clause 25, wherein the hydrocarbon and the carbon dioxide generating chemical blowing agent are present at a weight ratio of at least 2:1, at least 4:1, 4:1 to 10:1 or 4:1 to 6:1.

Clause 27. A process for producing a rigid polyurethane foam comprising reacting a polyisocyanate with the polyol premix of one of clause 1 to clause 26 at an isocyanate index of 90 to 150, such as 120 to 150.

Clause 28. A closed-celled, rigid polyurethane foam comprising the reaction product of a reaction mixture comprising: (a) a polyisocyanate; (b) a polyol composition comprising a polymer polyol having an OH number of greater than 260 mg KOH/g; (c) a catalyst; (d) a physical blowing agent composition comprising at least 50% by weight, based on the total weight of the physical blowing agent composition, of a hydrocarbon; and (e) a carbon dioxide generating chemical blowing agent.

Clause 29. The rigid polyurethane foam of clause 28, wherein the polymer polyol has a solids content of 20% to 65% by weight, 20% to 60% by weight, or 20% to 50% by weight, based on the total weight of the polymer polyol.

Clause 30. The rigid polyurethane foam of clause 28 or clause 29, wherein the polymer polyol comprises polymer particles comprising a free radical polymerization reaction product of an ethylenically unsaturated compound, such as a reaction product of a reaction mixture comprising: (a) a base polyol; (b) an ethylenically unsaturated compound, (c) optionally a preformed stabilizer, and (d) a free radical initiator.

Clause 31. The rigid polyurethane foam of clause 30, wherein the base polyol comprising a polyether polyol having a functionality of 2 to 6, 2 to 5 or 3 to 5, and an OH number of at least 200 mg KOH/g, at least 300 mg KOH/g, 300 to 1000 mg KOH/g, 300 to 800 mg KOH/g, 300 to 600 mg KOH/g, 300 to 500 mg KOH/g or 300 to 400 mg KOH/g.

Clause 32. The rigid polyurethane foam of clause 30 or clause 31, wherein the base polyol is derived from an alkylene oxide in which the content of ethylene oxide units in the base polyol, based on the total weight of the base polyol, is less than 30% by weight, no more than 28% by weight, no more than 25% by weight, no more than 20% by weight, no more than 10% by weight or no more than 5% by weight.

Clause 33. The rigid polyurethane foam of one of clause 30 to clause 32, wherein the ethylenically unsaturated compounds comprises an aliphatic conjugated diene, such as butadiene and isoprene; a monovinylidene aromatic monomer, such as styrene, α-methyl-styrene, (t-butyl)styrene, chlorostyrene, cyanostyrene and bromostyrene; an α,β-ethylenically unsaturated carboxylic acid or ester thereof, such as acrylic acid, methacrylic acid, methyl methacrylate, ethyl acrylate, 2-hydroxyethyl acrylate, butyl actylate, itaconic acid, and maleic anhydride; an α,β-ethylenically unsaturated nitrile and/or amide, such as acrylonitrile, methacrylonitrile, acrylamide, methacrylamide, N,N-dimethyl acrylamide, and N-(dimethylaminomethyl)-acrylamide; a vinyl ester, such as vinyl acetate; a vinyl ether; a vinyl ketone; a vinyl and/or vinylidene halide, or a mixture of any two or more thereof, such as where the ethylenically unsaturated monomer comprises at least one of styrene and its derivatives, acrylonitrile, methyl acrylate, methyl methacrylate, and vinylidene chloride, such as where the ethylenically unsaturated compound comprises styrene and acrylonitrile, such as where styrene and acrylonitrile are present in amounts such that the weight ratio of styrene to acrylonitrile (S:AN) is 80:20 to 20:80 or 75:25 to 25:75.

Clause 34. The rigid polyurethane foam of one of clause 30 to clause 33, wherein the pre-formed stabilizer comprises the reaction product of a reaction mixture comprising: (a) a macromer that contains reactive unsaturation, (b) an ethylenically unsaturated compound, (c) a free radical initiator, (d) a polymer control agent; and, in some cases, (e) a diluent, such as where the macromer comprises the reaction product of a reaction mixture comprising: (i) an H-functional starter having a functionality of 2 to 8 and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, such as 0.05 to 2.5% by weight, or 0.1 to 1.5% by weight, based on 100% by weight of the sum of components (i), (ii) and (iii), of a diisocyanate, such as where the macromer is not a polar polymer.

Clause 35. The rigid polyurethane foam one of clause 28 to clause 34, wherein the polymer polyol has an OH number of at least 280 mg KOH/g, at least 290 mg KOH/g or at least 300 mg KOH/g, such as where the polymer polyol also has an OH number of no more than 1000 mg KOH/g, no more than 800 mg KOH/g, no more than 600 mg KOH/g, no more than 500 mg KOH/g or no more than 400 mg KOH/g.

Clause 36. The rigid polyurethane foam of one of clause 28 to clause 35, wherein the polymer polyol is present in an amount of at least 30% by weight, at least 35% by weight, or at least 40% by weight, based on the total weight of the polyol composition, such as where the polymer polyol is also present in an amount of no more than 80% by weight, no more than 70% by weight, or no more than 60% by weight, based on the total weight of the polyol composition.

Clause 37. The rigid polyurethane foam of one of clause 28 to clause 36, wherein the polyol composition further comprises an aromatic amine-initiated polyether polyol, such as where the aromatic amine-initiated polyether polyol has a functionality of at least 2, 2 to 6, 3 to 5, 3.5 to 4.5, 3.8 to 4.2, or 3.8 to 4.0, and/or a number average molecular weight of 200 Da to 12,000 Da, 200 Da to 1,500 Da, 200 Da to 1,000 Da, 400 Da to 800 Da, 500 Da to 700 Da, or 500 Da to 600 Da, and/or a hydroxyl number of 300 to 500 mg KOH/g, 350 to 450 mg KOH/g, or 380 to 420 mg KOH/g.

Clause 38. The rigid polyurethane foam of clause 37, wherein the aromatic amine-initiated polyether polyol comprises the alkoxylation reaction product of a reaction mixture comprising a polyol starter comprising predominantly an aromatic amine, such as an aromatic diamine, with an alkylene oxide comprising predominantly propylene oxide, such as where the aromatic amine, such as aromatic diamine, such as a toluene diamine (such as ortho-toluene diamine) starter is present in an amount of more than 50% by weight, at least 80% by weight, at least 90% by weight, at least 98% by weight or at least 99% by weight, based on the total weight of H-functional initiator used to prepare the aromatic amine-initiated polyether polyol.

Clause 39. The rigid polyurethane foam of clause 37 or clause 38, wherein the aromatic-amine initiated polyether polyol is present in an amount of 10 to 40% by weight, 20 to 40% by weight or 25 to 35% by weight, based on the total weight of polyols in the polyol composition.

Clause 40. The rigid polyurethane foam of one of clause 28 to clause 39, wherein the polyol composition comprises an aromatic polyester polyol, such as the reaction product of an aromatic diacid or anhydride with a glycol or triol, such as those having an OH number of 150 to 410 mg KOH/g, 150 to 360 mg KOH/g, 200 to 335 mg KOH/g, or 200 to 250 mg KOH/g, and a functionality of 1.5 to 3 or 1.9 to 2.5.

Clause 41. The rigid polyurethane foam of clause 40, wherein the aromatic polyester polyol is present in an amount of 1 to 40% by weight or 5 to 20% by weight, based upon the total weight of the polyol composition.

Clause 42. The rigid polyurethane foam of one of clause 28 to clause 41, wherein the polyol composition is substantially free or completely free of any aromatic polyester polyol.

Clause 43. The rigid polyurethane foam of one of clause 28 to clause 42, wherein the polyol composition further comprises a saccharide-initiated polyether polyol, such as a saccharide-initiated polyether polyol having an OH number of from 200 to 600 mg KOH/g, 300 to 550 mg KOH/g, 400 to 500 mg KOH/g, or 450 to 500 mg KOH/g, and a functionality of 4 to 6, 5 to 6, 5.2 to 5.8, or 5.4 to 5.6.

Clause 44. The rigid polyurethane foam of clause 43, wherein the saccharide-initiated polyether polyol is present in an amount of 10 to 45% by weight, 10 to 30% by weight, or 15 to 25% by weight, based on the total weight of the polyols in the polyol composition.

Clause 45. The rigid polyurethane foam of one of clause 28 to clause 44, wherein the polyol composition further comprises an aliphatic triol-initiated polyether polyol, such as those having an OH number of 100 to 500 mg KOH/g, 200 to 400 mg KOH/g, 200 to 300 mg KOH/g, 200 to 250 mg KOH/g, 230 to 250 mg KOH/g or 233 to 243 mg KOH/g, and a functionality of from greater than 2 to 4, 2.5 to 3.5, or 3.0.

Clause 46. The rigid polyurethane foam of clause 45, wherein the aliphatic-triol initiated polyether polyol is present in an amount of 1 to 20% by weight, such as 5 to 20% by weight, or 10 to 20% by weight, based on the total weight of the polyols in the polyol composition.

Clause 47. The rigid polyurethane foam of one of clause 28 to clause 46, wherein the polyol composition comprises an alkanolamine-initiated polyether polyol, such as those having an OH number of at least 500 mg KOH/g, 500 to 900 mg KOH/g, 600 to 800 mg KOH/g, or 680 to 720 mg KOH/g, and a functionality of 2.5 to 4 or 2.5 to 3.5.

Clause 48. The rigid polyurethane foam of clause 47, wherein the alkanolamine-initiated polyether polyol is present in an amount of 1 to 20%, 1 to 10%, or 2 to 10% by weight, based upon the total weight of the polyol composition.

Clause 49. The rigid polyurethane foam of one of clause 28 to clause 48, wherein the hydrocarbon comprises n-pentane, cyclopentane, and/or isopentane, such as where cyclopentane, n-pentane, and/or isopentane, is present in an amount of at least 10% by weight, 10 to 30% by weight or 10 to 20% by weight, based on the total weight of the reaction mixture, except for the polyisocyanate.

Clause 50. The rigid polyurethane foam of one of clause 28 to clause 49, wherein the hydrocarbon is present in an amount of at least 50% by weight, at least 70% by weight, at least 80% by weight, at least 90% by weight, at least 95% by weight, or, in some cases, at least 98% by weight, based on the total weight of the physical blowing agent composition.

Clause 51. The rigid polyurethane foam of one of clause 28 to clause 50, wherein the carbon dioxide generating chemical blowing agent comprises water and/or a formate-blocked amine, such as where the carbon dioxide generating chemical blowing agent is present in an amount of 0.5 to 5.0% by weight, 1 to 4% by weight, 1.0 to 3.0% by weight, or 2.0 to 3.0% by weight, based on the total weight of the polyol premix.

Clause 52. The rigid polyurethane foam of one of clause 28 to clause 51, wherein the physical blowing agent composition comprises a hydrocarbon, such as cyclopentane and/or isopentane, and the carbon dioxide generating chemical blowing agent comprises water, wherein the hydrocarbon and the water are present in an amount of at least 90% by weight, at least 95% by weight, or at least 99% by weight, based on the total weight of the blowing agent composition.

Clause 53. The rigid polyurethane foam of one of clause 28 to clause 52, wherein the hydrocarbon and the carbon dioxide generating chemical blowing agent are present at a weight ratio of at least 2:1, at least 4:1, 4:1 to 10:1 or 4:1 to 6:1.

Clause 54. The rigid polyurethane foam of one of clause 28 to clause 53, wherein the rigid polyurethane foam has a closed-cell content of more than 80 percent, more than 85 percent, or more than 88 percent, measured according to ASTM D6226-15.

Clause 55. The rigid polyurethane foam of one of clause 28 to clause 54, wherein the rigid polyurethane foam has a thermal conductivity measured at 35° F. (2° C.) of less than 0.150 BTU-in/h-ft$^2$-° F. or less than 0.130 BTU-in/h-ft$^2$-° F., and measured at 75° F. (24° C.) of less than 0.160 BTU-in/h-ft$^2$-° F. or less than 0.140 BTU-in/h-ft$^2$-° F., for foam from the core of 2-inch thick panels, as measured according to ASTM C518-15.

Clause 56. A refrigerator, freezer, cooler or refrigerated trailer comprising the rigid polyurethane foam of one of clause 28 to clause 55.

Clause 57. A composite article comprising the rigid polyurethane foam of one of clause 28 to clause 55 sandwiched between one or more facer substrates, such as where the facer substrate(s) comprise plastic, such a polypropylene resin reinforced with continuous bi-directional glass fibers or a fiberglass reinforced polyester copolymer, paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the polyurethane foams produced according to the present specification in sandwich composites for trailer floors.

Clause 54. A process for producing the rigid polyurethane foam of one of clause 28 to clause 55, comprising mixing the polyisocyanate with the polyol composition at an isocyanate index of 90 to 150 or 120 to 150.

The non-limiting and non-exhaustive examples that follow are intended to further describe various non-limiting and non-exhaustive implementations without restricting the scope of the implementations described in this specification.

EXAMPLES

Foam-forming compositions were prepared using the following materials:

POLYOL 1: a sucrose and glycerin-initiated polyether polyol (100% propylene oxide epoxide block) having an OH number of 455-485 mg KOH/g and an average functionality of 4.7;

POLYOL 2: an ortho-toluenediamine initiated polyether polyol having an OH number of 380-420 mg KOH/g and an average functionality of 4;

POLYOL 3: an ortho-toluenediamine initiated polyether polyol (63% propylene oxide/37% ethylene oxide epoxide block) having an OH number of 378-398 mg KOH/g and an average functionality of 4;

POLYOL 4: a glycerin-initiated polyether polyol (100% propylene oxide epoxide block) having an OH number of 233-243 mg KOH/g and a functionality of 3;

POLYOL 5: a monoethanolamine-initiated polyether polyol (100% propylene oxide epoxide block) having an OH number of 685 to 715 mg KOH/g and a functionality of 3;

POLYOL 6: an aromatic polyester polyol having an OH number of 230-250 mg KOH/g and a viscosity of 2,000-4,000 mPa·s at 25° C. (commercially available from Stepan Company as STEPANPOL® PS-2502A);

POLYOL 7: a modified n aromatic polyester polyol having an OH number of 230-250 mg KOH/g and a viscosity of 2,000-4,000 mPa·s at 25° C. (commercially available from Stepan Company as STEPANPOL® PS-2352);

POLYOL 8: a polymer polyol having an OH number of 346 mg KOH/g and a solids content of 25%, prepared by in-situ polymerization of a 1:1 mass ratio mixture of butyl acrylate and hydroxyethyl acrylate in a base polyol, in which the base polyol has an OH number of 365 to 395 and a functionality of 3 and is a sucrose/propylene glycol/water-initiated polyether polyol (100% propylene oxide epoxide block);

POLYOL 9: a polymer polyol having an OH number of 247 mg KOH/g and a solids content of 20%, prepared by in-situ polymerization of a 1:1 mass ratio mixture of styrene and acrylonitrile in a base polyol, in which the base polyol is a 1:1 mass ratio mixture of POLYOL 4 and a sucrose/water-initiated polyether polyol (100% propylene oxide epoxide block) having an OH number of 370 to 390 and a functionality of 5.3;

POLYOL 10: a polymer polyol having an OH number of 295 mg KOH/g and a solids content of 20%, prepared by in-situ polymerization of a 3:2 mass ratio mixture of styrene and acrylonitrile in a base polyol, in which the base polyol is a mixture of 3 parts by mass of POLYOL 3 to 1 part by mass of POLYOL 4;

POLYOL 11: a polymer polyol having an OH number of 260 mg KOH/g and a solids content of 20%, prepared by in-situ polymerization of a 1:1 mass ratio mixture of styrene and acrylonitrile in a base polyol, in which the base polyol is a polypropylene glycol having an OH number of 495 to 535;

POLYOL 12: a polymer polyol having an OH number of 480 mg KOH/g and a solids content of 25%, prepared by in-situ polymerization of a 1:1 mass ratio mixture of butyl acrylate and hydroxyethyl acrylate in a base polyol, in which the base polyol is a mixture of 3 parts by mass of POLYOL 1 to 1 part by mass of POLYOL 5;

POLYOL 13: a polymer polyol having an OH number of 345 mg KOH/g and a solids content of 30%, prepared by in-situ polymerization of butyl acrylate in a base polyol, in which the base polyol is a glycerin-initiated polyether polyol (100% propylene oxide epoxide block) having an OH number of 445 to 495 and a functionality of 3;

CATALYST 1: N,N,N',N',N"-pentamethyldiethylenetriamine (POLYCAT® 5 from Evonik;

CATALYST 2: N,N-dimethylcyclohexanamine (POLYCAT® 8 from Evonik)

CATALYST 3: N, N', N"-Tris(dimethylaminopropyl)-s-hexahydrotriazine catalyst (POLYCAT® 41 from Air Products)

SURFACTANT 1: a silicone surfactant (TEGOSTAB® B 8465 from Evonik);

SURFACTANT 2: a silicone surfactant (TEGOSTAB® B 8499 from Evonik);

ADDITIVE 1: Tris (2-chloroisopropyl) phosphate (Fyrol™ PCF from ICL Industrial Products);

ISOCYANATE 1: a polymeric diphenylmethane diisocyanate (pMDI); NCO weight 31%; viscosity 400 mPa·s @ 25° C.; functionality 3.05;

ISOCYANATE 2: a polymeric diphenylmethane diisocyanate (pMDI); NCO weight 31.5%; viscosity 200 mPa·s @ 25° C.; equivalent weight 133; functionality 2.8.

Example 1

Polyol premixes were prepared using the ingredients and amounts (in parts by weight) set forth in Table 1.

TABLE 1

| Component | Example 1A | Example 1B | Example 1C | Example 1D |
|---|---|---|---|---|
| POLYOL 1 | 42.02 | — | — | — |
| POLYOL 2 | 29.94 | 29.94 | 29.94 | 29.94 |
| PMPO | — | 42.02 | 42.02 | 42.02 |

TABLE 1-continued

|  | (POLYOL 13) | (POLYOL 8) | (POLYOL 9) |  |
|---|---|---|---|---|
| POLYOL 3 | — | — | — | — |
| POLYOL 4 | — | — | — | — |
| POLYOL 6 | 9.82 | 9.82 | 9.82 | 9.82 |
| SURFACTANT 1 | 2.45 | 2.45 | 2.45 | 2.45 |
| CATALYST 1 | 0.33 | 0.33 | 0.33 | 0.33 |
| CATALYST 2 | 0.78 | 0.78 | 0.78 | 0.78 |
| CATALYST 3 | 0.39 | 0.39 | 0.39 | 0.39 |
| Water | 1.82 | 1.82 | 1.82 | 1.82 |
| Cyclopentane | 12.45 | 12.45 | 12.45 | 12.45 |

| Component | Example 1E | Example 1F | Example 1G | Example 1H |
|---|---|---|---|---|
| POLYOL 1 | — | — | — | — |
| POLYOL 2 | 29.94 | 29.94 | 29.94 | 29.94 |
| PMPO | 42.02 | 42.02 | 51.84 | — |
|  | (POLYOL 10) | (POLYOL 11) | (POLYOL 10) |  |
| POLYOL 3 | — | — | — | 31.93 |
| POLYOL 4 | — | — | — | 10.64 |
| POLYOL 6 | 9.82 | 9.82 | — | — |
| SURFACTANT 1 | 2.45 | 2.45 | 2.45 | 2.45 |
| CATALYST 1 | 0.33 | 0.33 | 0.33 | 0.33 |
| CATALYST 2 | 0.78 | 0.78 | 0.78 | 0.78 |
| CATALYST 3 | 0.39 | 0.39 | 0.39 | 0.39 |
| Water | 1.82 | 1.82 | 1.82 | 1.82 |
| Cyclopentane | 12.45 | 12.45 | 12.45 | 12.45 |

Figure 1:
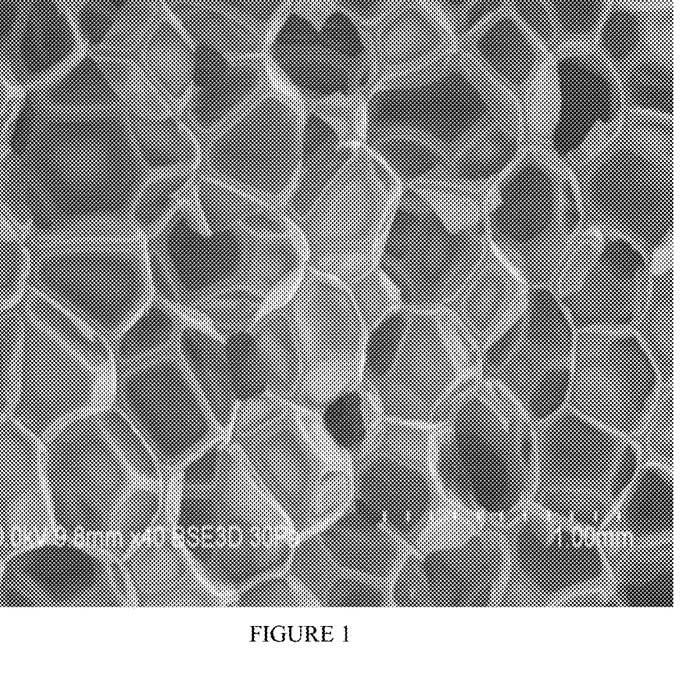
FIG. 1 is a 40× magnification of an SEM image (20.0 kV energy level) of the foam produced according to Example 1A (from roughly the center of the panel)
Figure 2:
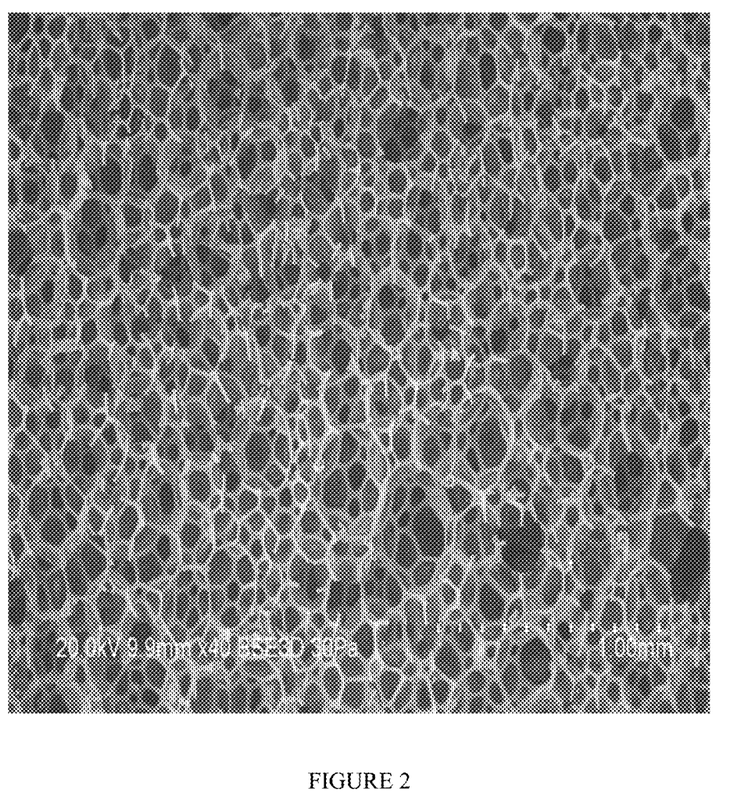
FIG. 2 is a 40× magnification of an SEM image (20.0 kV energy level) of the foam produced according to Example 1E (from roughly the center of the panel).

Foam samples were prepared by hand using an air-powered mixer (~3000 rpm) and utilizing a temperature controlled mold (120° F.; dimensions of 25"×13"×2"). The polyol premix and isocyanate temperatures were maintained at 25° C. and all samples were demolded after 3 minutes. Minimum fill was determined by slightly overfilling the mold cavity and then removing the excess foam such that the foam weight contained in the 25"×13"×2" volume could be measured. After determining the minimum fill value, foam panels were prepared to obtain a desired density approximately 8-12% over the minimum fill density The foams were tested for various properties and the results are set forth in Table 2. Flow was evaluated as described in U.S. Pat. No. 10,106,641 B2 (at col. 12, lines 22-61, the cited portion of which being incorporated herein by reference). 40× magnification of an SEM image (20.0 kV energy level) of the foam produced according to Example 1A and Example 1E (from roughly the center of each panel) are illustrated in FIG. 1 and FIG. 2 respectively.

TABLE 2

| Category | Property | Ex. 1A | Ex. 1B | Ex. 1C | Ex. 1D |
|---|---|---|---|---|---|
| Reactivity | Cream Time (s) | 6 | 5 | 6 | 5 |
|  | Gel Time (s) | 43 | 41 | 30 | 40 |
|  | Tack-Free Time (s) | 48 | 73 | 49 | 47 |
|  | Free-Rise Density (pcf) | 1.50 | 1.58 | 1.61 | 1.59 |
| Flow | Final Height (cm) | 110 | 99 | 103 | 110 |
|  | Max. Rise Rate (cm/s) | 4.3 | 4.6 | 5.0 | 4.7 |
|  | Max. Pressure (hPa) | 256 | 132 | 302 | 182 |
| Panel Info. | Min. Fill Density (pcf) | 1.72 | 1.89 | 1.88 | 1.72 |
|  | Overpack Density (pcf) | 1.92 | 2.06 | 2.09 | 1.89 |
|  | Core Density (pcf) | 1.74 | 1.78 | 1.82 | 1.68 |
| Cell Content | Closed Cell Content | 88.6 | 34.7 | 90.0 | 88.1 |
|  | Open Cell Content | 9.1 | 63.2 | 7.7 | 9.8 |
| K-Factor (BTU · in)/(hr · ft$^2$ · ° F.) | 35° F. | 0.135 | 0.208 | 0.132 | 0.134 |
|  | 75° F. | 0.148 | 0.227 | 0.143 | 0.146 |
| K-factor Improvement* | 35° F. | — | — | 2.2% | 0.7% |
|  | 75° F. | — | — | 3.4% | 1.4% |
| Dimensional Stability (%) | 1 Day @ −30° C. | −0.25 | 1.00 | 0.35 | −0.18 |
|  | 1 Day @ 70° C. | −0.45 | 0.58 | −0.15 | −0.60 |
|  | 7 Day @ −30° C. | −0.35 | 0.43 | 0.08 | −0.03 |
|  | 7 Day @ 70° C. | 0.70 | 2.05 | 0.30 | 0.00 |
| Compressive Strength (+, psi) | Modulus (+) | 420 | 499 | 414 | 358 |
|  | 10% (+) | 17 | 17 | 16 | 12 |
| Compressive Strength (=, psi) | Modulus (=) | 826 | 852 | 796 | 624 |
|  | 10% (=) | 35 | 28 | 33 | 26 |
| Cell Size | Average (+) | 426 | 317 | 270 | 363 |
|  | Std. Dev. (+) | 46 | 78 | 48 | 51 |
|  | Average (=) | 404 | 314 | 284 | 335 |
|  | Std. Dev. (=) | 48 | 58 | 54 | 45 |

TABLE 2-continued

| Category | Property | Ex. 1E | Ex. 1F | Ex. 1G | Ex. 1H |
|---|---|---|---|---|---|
| Reactivity | Cream Time (s) | 4 | 5 | 4 | 5 |
|  | Gel Time (s) | 32 | 39 | 34 | 45 |
|  | Tack-Free Time (s) | 42 | 62 | 53 | 72 |
|  | Free-Rise Density (pcf) | 1.61 | 1.59 | 1.58 | 1.53 |
| Flow | Final Height (cm) | 108 | 108 | 107 | 108 |
|  | Max. Rise Rate (cm/s) | 5.3 | 4.8 | 4.4 | 3.6 |
|  | Max. Pressure (hPa) | 211 | 153 | 220 | 182 |
| Panel Info. | Min. Fill Density (pcf) | 1.83 | 1.83 | 1.87 | 1.72 |
|  | Overpack Density (pcf) | 2.05 | 1.96 | 2.07 | 1.92 |
|  | Core Density (pcf) | 1.65 | 1.73 | 1.75 | 1.68 |
| Cell Content | Closed Cell Content | 89.7 | 87.5 | 89.7 | 87.8 |
|  | Open Cell Content | 8.0 | 10.3 | 7.5 | 10.0 |
| K-Factor (BTU · in)/(hr · ft$^2$ · °F.) | 35° F. | 0.131 | 0.134 | 0.128 | 0.134 |
|  | 75° F. | 0.141 | 0.146 | 0.138 | 0.146 |
| K-factor Improvement* | 35° F. | 3.0% | 0.7% | 5.2% | 0.7% |
|  | 75° F. | 4.7% | 1.4% | 6.8% | 1.4% |
| Dimensional Stability (%) | 1 Day @ −30° C. | −0.10 | −0.25 | −0.60 | 0.00 |
|  | 1 Day @ 70° C. | −0.98 | −0.98 | −0.20 | −0.20 |
|  | 7 Day @ −30° C. | −0.15 | −0.18 | −0.10 | 0.60 |
|  | 7 Day @ 70° C. | −0.68 | 0.50 | −0.35 | −0.50 |
| Compressive Strength (+, psi) | Modulus (+) | 554 | 429 | 468 | 325 |
|  | 10% (+) | 17 | 13 | 14 | 12 |
| Compressive Strength (=, psi) | Modulus (=) | 1056 | 952 | 1191 | 845 |
|  | 10% (=) | 31 | 27 | 31 | 28 |
| Cell Size | Average (+) | 230 | 301 | 221 | — |
|  | Std. Dev. (+) | 40 | 55 | 44 | — |
|  | Average (=) | 250 | 330 | 223 | — |
|  | Std. Dev. (=) | 47 | 63 | 49 |  |

*K-factor improvement was calculated as the % reduction in K-factor relative to Example 1A.

Example 2

Polyol premixes were prepared using the ingredients and amounts (in parts by weight) set forth in Table 3.

TABLE 3

| Component | Example 2A | Example 2B | Example 2C |
|---|---|---|---|
| POLYOL 1 | 34.16 | 0.00 | 0.00 |
| POLYOL 5 | 11.95 | 0.00 | 11.95 |
| POLYOL 7 | 34.20 | 34.20 | 34.20 |
| PMPO | 0.00 | 46.02 (POLYOL 12) | 34.23 (POLYOL 10) |
| SURFACTANT 2 | 1.99 | 1.99 | 1.99 |
| CATALYST 1 | 0.07 | 0.20 | 0.04 |
| CATALYST 2 | 0.11 | 0.07 | 0.07 |
| ADDITIVE 1 | 5.00 | 5.00 | 5.00 |
| Water | 1.27 | 1.27 | 1.27 |
| cyclopentane | 9.00 | 9.00 | 9.00 |
| isopentane | 2.25 | 2.25 | 2.25 |

Foams samples were prepared and tested as described above with respect to Example 1, except that all samples of Example 2 were demolded after 20 minutes. Results are set forth in Table 4.

TABLE 4

| Category | Property | Ex. 2A | Ex. 2B | Ex. 2C |
|---|---|---|---|---|
| Reactivity | Cream Time (s) | 44 | 44 | 30 |
|  | Gel Time (s) | 218 | 178 | 178 |
|  | Free-Rise Density (pcf) | 2.20 | 2.30 | 2.20 |
| Flow | Final Height (cm) | 82 | 82 | 81 |
|  | Max. Rise Rate (cm/s) | 0.52 | 0.65 | 0.60 |
|  | Max. Pressure (hPa) | 154 | 156 | 109 |
| Panel Info. | Min. Fill Density (pcf) | 2.31 | 2.33 | 2.19 |
|  | Overpack Density (pcf) | 2.56 | 2.59 | 2.40 |
|  | Core Density (pcf) | 2.07 | 2.19 | 2.27 |
| Cell Content | Closed Cell Content | 85.7 | 86.1 | 83.3 |
|  | Open Cell Content | 11.5 | 11.0 | 13.9 |
| K-Factor (BTU · in)/(hr · ft$^2$ · °F.) | 35° F. | 0.157 | 0.153 | 0.146 |
|  | 75° F. | 0.169 | 0.162 | 0.158 |
| K-factor Improvement* | 35° F. | — | 2.5% | 7.0% |
|  | 75° F. | — | 4.1% | 6.5% |
| Dimensional Stability (%) | 1 Day @ −30° C. | 1.50 | 3.35 | 1.10 |
|  | 1 Day @ 70° C. | −0.05 | 0.05 | −0.20 |
|  | 7 Day @ −30° C. | 1.40 | 2.75 | 1.30 |
|  | 7 Day @ 70° C. | −0.25 | −0.20 | −0.50 |
| Compressive Strength (+, psi) | Modulus (+) | 404 | 384 | 240 |
|  | 10% (+) | 16 | 17 | 11 |

TABLE 4-continued

| Category | Property | Ex. 2A | Ex. 2B | Ex. 2C |
| --- | --- | --- | --- | --- |
| Compressive Strength (=, psi) | Modulus (=) | 1088 | 1119 | 1287 |
| | 10% (=) | 38 | 39 | 29 |
| Cell Size | Average (+) | 556 | 446 | 438 |
| | Std. Dev. (+) | 161 | 97 | 76 |
| | Average (=) | 533 | 509 | 502 |
| | Std. Dev. (=) | 128 | 137 | 103 |

*K-factor improvement was calculated as the % reduction in K-factor relative to Example 2A.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam-forming composition comprising:
   (a) a polyol composition comprising at least 30% by weight, based on the total weight of the polyol composition, of a polymer polyol having an OH number of greater than 260 mg KOH/g;
   (b) a catalyst;
   (c) a physical blowing agent composition comprising at least 50% by weight, based on the total weight of the physical blowing agent composition, of a hydrocarbon;
   (d) a carbon dioxide generating chemical blowing agent; and
   (e) a polyisocyanate present in an amount sufficient to provide an isocyanate index of 90 to 150,
   with the proviso that the polymer polyol does not include a base polyol prepared from a natural oil, and
   with the proviso that the polymer polyol does not include a DMC-catalyzed base polyol.

2. The polyurethane foam-forming composition of claim 1, wherein the polymer polyol comprises polymer particles comprising a reaction product of a reaction mixture comprising:
   (i) a base polyol;
   (ii) an ethylenically unsaturated compound, optionally
   (iii) a preformed stabilizer, and
   (iv) a free radical initiator.

3. The polyurethane foam-forming composition of claim 2, wherein the base polyol comprising a polyether polyol having a functionality of 2 to 6 and an OH number of at least 300 mg KOH/g.

4. The polyurethane foam-forming composition of claim 2, wherein the content of ethylene oxide units in the base polyol, based on the total weight of the base polyol, is no more than 20% by weight.

5. The polyurethane foam-forming composition of claim 2, wherein the ethylenically unsaturated compound comprises styrene and acrylonitrile at a weight ratio of styrene to acrylonitrile (S:AN) of 80:20 to 20:80.

6. The polyurethane foam-forming composition of claim 1, wherein the polymer polyol has an OH number of at least 280 mg KOH/g.

7. The polyurethane foam-forming composition of claim 1, wherein the polymer polyol is present in an amount of at least 35% by weight, based on the total weight of the polyol composition.

8. The polyurethane foam-forming composition of claim 1, wherein the polyol composition comprises an aromatic amine-initiated polyether polyol having a functionality of 2 to 6 and a hydroxyl number of 300 to 500 mg KOH/g, wherein the aromatic-amine initiated polyether polyol is present in an amount of 10 to 40% by weight, based on the total weight of polyols in the polyol composition.

9. The polyurethane foam-forming composition of claim 8, wherein the polyol composition comprises an aromatic polyester polyol having an OH number of 150 to 410 and a functionality of 1.5 to 3, wherein the aromatic polyester polyol is present in an amount of 1 to 40% by weight, based upon the total weight of the polyol composition.

10. The polyurethane foam-forming composition of claim 1, wherein hydrocarbon is present in an amount of at least 90% by weight, based on the total weight of the physical blowing agent composition.

11. The polyurethane foam-forming composition of claim 1, wherein the hydrocarbon and a carbon dioxide generating chemical blowing agent are present in the blowing agent composition at a weight ratio of at least 2:1.

12. The polyurethane foam-forming composition of claim 11, wherein the hydrocarbon and a carbon dioxide generating chemical blowing agent are present in the blowing agent composition at a weight ratio of at least 4:1.

13. The polyurethane foam-forming composition of claim 12, wherein the hydrocarbon and a carbon dioxide generating chemical blowing agent are present in the blowing agent composition at a weight ratio of 4:1 to 10:1.

14. The polyurethane foam-forming composition of claim 11, wherein the polyurethane foam-forming composition is substantially free of halogenated blowing agent.

15. The polyurethane foam-forming composition of claim 1, wherein the polyisocyanate is present in an amount sufficient to provide an isocyanate index of 120 to 150.

16. The polyurethane foam-forming composition of claim 8, wherein the aromatic amine-initiated polyether polyol is present in an amount of 20 to 40% by weight, based on the total weight of polyols in the polyol composition.

17. The polyurethane foam-forming composition of claim 1, wherein the polyol composition comprises an alkanolamine-initiated polyether polyol having an OH number of at least 500 mg KOH/g and a functionality of 2.5 to 4.

18. The polyurethane foam-forming composition of claim 17, wherein the alkanolamine-initiated polyether polyol is present in an amount of 1 to 20%, based on the total weight of polyols in the polyol composition.

* * * * *